(12) United States Patent
Hulick, Jr. et al.

(10) Patent No.: US 12,438,800 B2
(45) Date of Patent: Oct. 7, 2025

(54) CLOUD NATIVE OBSERVABILITY MIGRATION AND ASSESSMENT

(71) Applicant: Cisco Technology, Inc., San Jose, CA (US)

(72) Inventors: Walter Theodore Hulick, Jr., Pearland, TX (US); David John Zacks, Vancouver (CA); Thomas Szigeti, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 19/185,504

(22) Filed: Apr. 22, 2025

(65) Prior Publication Data

US 2025/0247318 A1     Jul. 31, 2025

Related U.S. Application Data

(63) Continuation of application No. 18/215,508, filed on Jun. 28, 2023, now Pat. No. 12,284,105.

(51) Int. Cl.
*G06F 15/173* (2006.01)
*H04L 43/065* (2022.01)
*H04L 43/50* (2022.01)

(52) U.S. Cl.
CPC ............ *H04L 43/50* (2013.01); *H04L 43/065* (2013.01)

(58) Field of Classification Search
CPC .............................. H04L 43/50; H04L 43/065
See application file for complete search history.

(56) References Cited

U.S. PATENT DOCUMENTS

| | | |
|---|---|---|
| 7,685,271 B1 | 3/2010 | Schneider et al. |
| 10,270,644 B1 | 4/2019 | Valsecchi et al. |
| 10,671,520 B1 | 6/2020 | Rodrigues et al. |
| 11,385,886 B2 | 7/2022 | Shmouely et al. |
| 2009/0265681 A1 | 10/2009 | Beto et al. |
| 2017/0199811 A1 | 7/2017 | Narayan et al. |
| 2022/0050902 A1 | 2/2022 | Hulick, Jr. |
| 2022/0191602 A1 | 6/2022 | Herdrich et al. |
| 2022/0286364 A1 | 9/2022 | Ashok et al. |
| 2023/0033681 A1 | 2/2023 | Hulick, Jr. et al. |
| 2023/0246927 A1 | 8/2023 | Siakou et al. |

OTHER PUBLICATIONS

Chalin P., "OpenTelemetry Protocol Specification," GitHub Inc, Accessed Jun. 26, 2023, 16 pages.
Kratzke N., "Cloud-Native Observability: The Many-Faceted Benefits of Structured and Unified Logging-A Multi-Case Study," Future Internet 2022, 14, 274, MDPI, Sep. 2022, pp. 1-23.
Ostrowski G., "OpenTelemetry Is Transforming IT Departments. Here's How," The New Stack, Accessed Jun. 26, 2023, 9 pages.
"OTLP Specification 0.20.0," The OpenTelemetry Authors, Accessed Jun. 26, 2023, 16 pages.

*Primary Examiner* — Joseph R Maniwang
(74) *Attorney, Agent, or Firm* — Lee & Hayes, P.C.; James M. Behmke

(57) ABSTRACT

In one embodiment, a device obtains testing parameters used by a plurality of agents in a network to perform testing with respect to an online application. The device identifies overlapping parameters among the testing parameters and generates a consolidated set of testing parameters for the overlapping parameters. The device configures the plurality of agents such that a singular testing agent performs testing with respect to the online application using the consolidated set of testing parameters instead of multiple testing agents performing testing with respect to the online application using the overlapping parameters.

20 Claims, 5 Drawing Sheets

US 12,438,800 B2

CLOUD NATIVE OBSERVABILITY MIGRATION AND ASSESSMENT

RELATED APPLICATION

This application is a continuation of U.S. patent application Ser. No. 18/215,508, filed on Jun. 28, 2023, entitled "CLOUD NATIVE OBSERVABILITY MIGRATION AND ASSESSMENT" by Hulick et al., the contents of which are incorporated by reference herein.

TECHNICAL FIELD

The present disclosure relates generally to computer networks, and, more particularly, to cloud native observability migration and assessment.

BACKGROUND

Cloud native observability and monitoring systems, such as OpenTelemetry, are gaining popularity among companies as a cloud management platform to provide end-to-end tracing, analytics, and other telemetry data across companies and organizations. Cloud native observability and monitoring systems allow for microservice applications to be spun up and deployed in a cloud computing environment to be monitored.

Currently, many companies and organizations utilize legacy proprietary systems designed to monitor monolithic applications. As these companies and organizations opt to migrate toward cloud native observability and monitoring systems, they may want to track and assess adoption of the cloud native observability and monitoring systems across their company or organization. However, it is possible that tracking and assessing adoption of the cloud native observability and monitoring systems across a particular company or organization can be a difficult and cumbersome task, particularly for larger companies and organizations.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device obtains testing parameters used by a plurality of agents in a network to perform testing with respect to an online application. The device identifies overlapping parameters among the testing parameters and generates a consolidated set of testing parameters for the overlapping parameters. The device configures the plurality of agents such that a singular testing agent performs testing with respect to the online application using the consolidated set of testing parameters instead of multiple testing agents performing testing with respect to the online application using the overlapping parameters.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
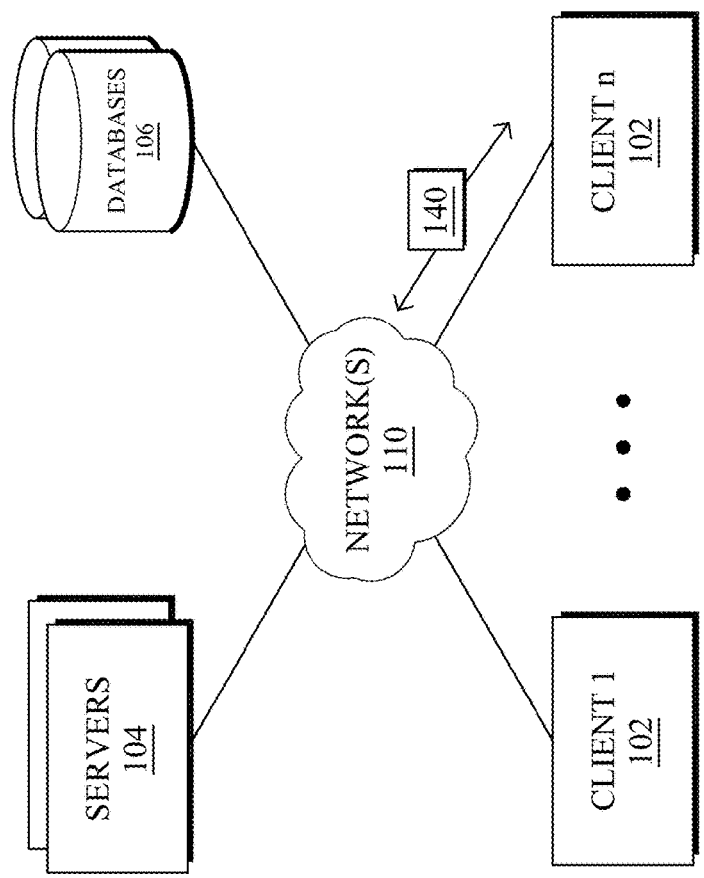
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
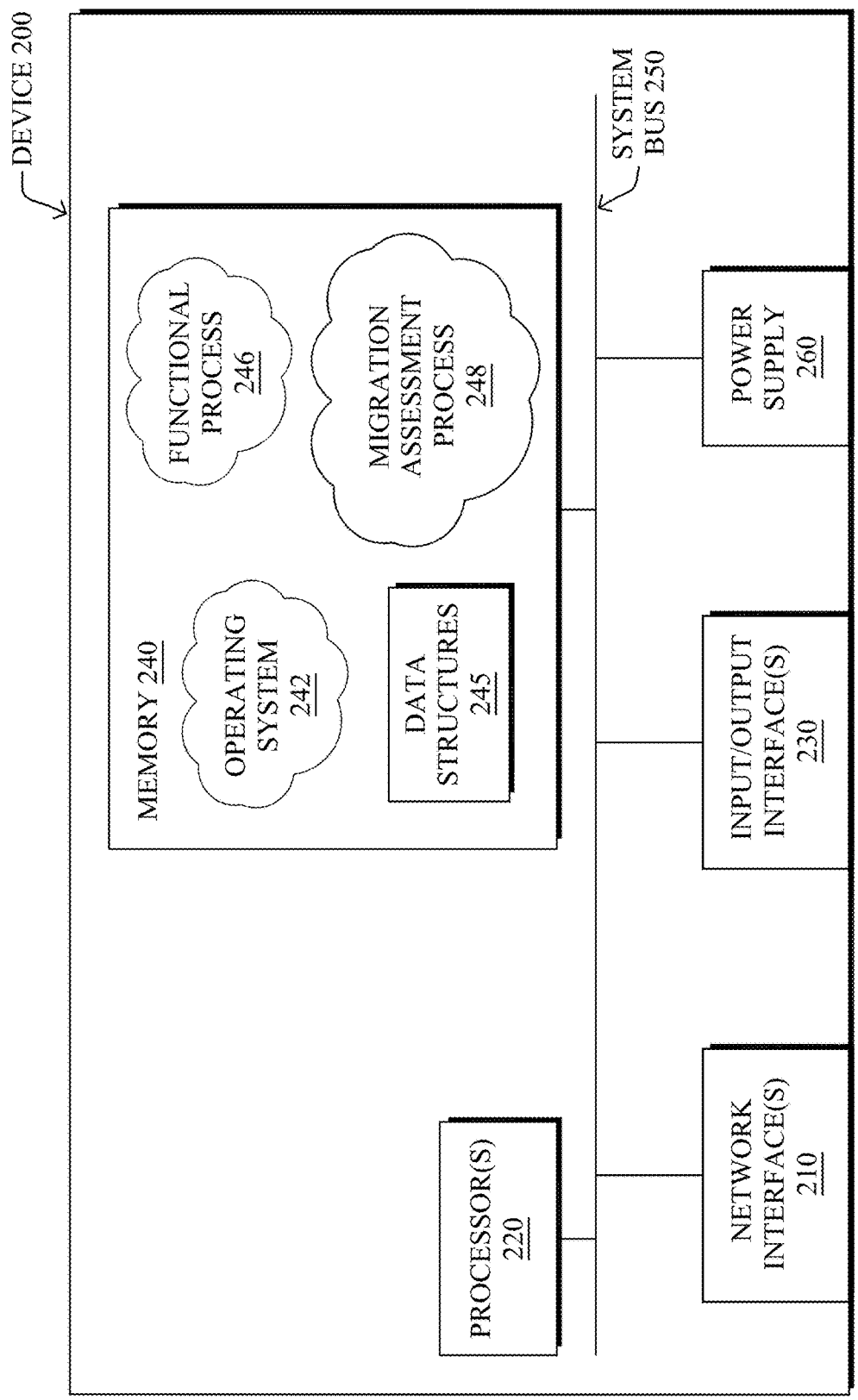
FIG. 2 illustrates an example computing device/node.

FIG. 2 is a schematic block diagram of an example node/device 200 (e.g., an apparatus) that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "migration assessment" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
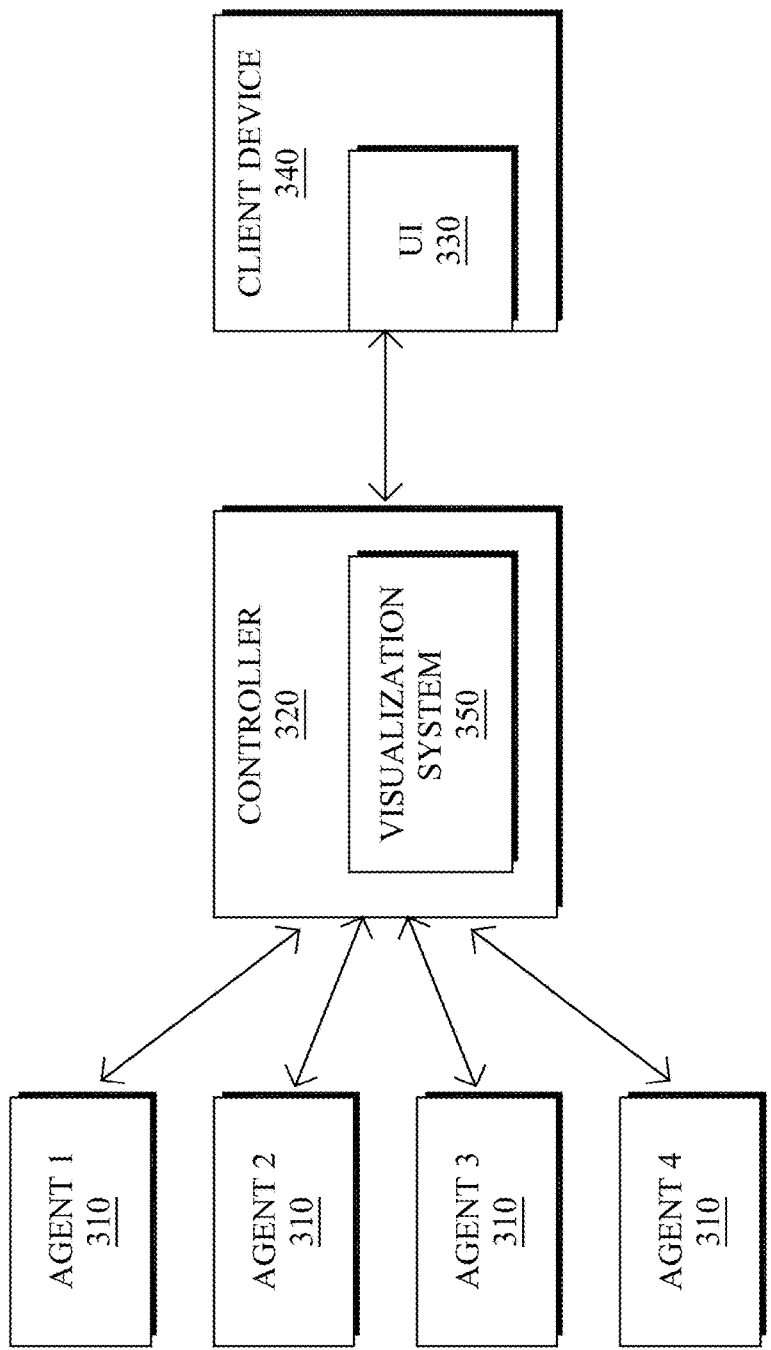
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page— e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the observability intelligence platform 300. In an illustrative on-premises (On-Prem) implementation, a controller instance 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a Hypertext Transfer Protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, both self-learned baselines and configurable thresholds may be used to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

—Cloud Native Observability Migration and Assessment—

This innovation pertains to an enterprise system designed to detect and report metrics on the adoption, migration, and deployment of cloud native monitoring systems (e.g., OpenTelemetry full stack observability systems) across applications, virtualized clusters, networking gear, and cloud native environments to assess a company's velocity and service levels during migration from proprietary monitoring systems (e.g., application performance monitoring systems, etc.) to a cloud native monitoring system, such as an OpenTelemetry system.

A key challenge that may arise in the above scenarios is predicting how far along adoption of cloud native monitoring systems across a company or organization and/or predicting when adoption of cloud native monitoring systems across a company or organization will be complete. Accordingly, the present disclosure provides an automated system that tracks and monitors adoption of cloud native monitoring systems across a company or organization. As described in more detail, herein, the automated system that tracks and monitors adoption of cloud native monitoring systems across a company or organization of the present disclosure can include multiple components that work together to generate an inventory containing information (e.g., metrics) regarding the overall adoption of cloud native monitoring systems across a company or organization.

In some embodiments, the information regarding the adoption of cloud native monitoring systems across a company or organization that is tracked and monitored can be presented via a user interface (e.g., the UI 330) in, for example, a dashboard or other display. Non-limiting examples of such information can include coverage, progress, velocity, and/or "blind spots," among other metrics that can be utilized by the company or organization to predict how far along adoption of cloud native monitoring systems across the company or organization is and/or to predict when adoption of cloud native monitoring systems across the company or organization will be complete. For example, the company or organization may use the information to determine whether to increase investment in the migration effort or whether to decrease investment in the migration effort. In addition, the company or organization may use the information gauge the overall success of the migration effort.

As described in more detail below, a controller (e.g., the controller 320 of FIG. 3, the migration assessment system 448 of FIG. 4, etc.) collects various telemetry data, metrics, events, etc. from instrumentation points (e.g., network instrumentation points, application instrumentation points, etc.) in a network. The controller can then generate and send notifications (e.g., emails, text messages, etc.) based on specific configurable alerts set in the policy associated with the controller and/or network to one or more distribution lists as defined by the policy. In some embodiments, the controller can then provide a "linkage" between components of the network that include cloud native monitoring systems (e.g., OpenTelemetry instrumentation) and configure the distribution lists to provide reports and/or alerts regarding the adoption of cloud native monitoring systems across the company or organization. The controller can then generate migration and/or adoption data for visualization by a user of the network. In some embodiments, the visualization can be provided as HeatMap data that is visualized on a dashboard or other user interface.

In some embodiments, aspects of the present disclosure can be realized in connection with a continuous integration, continuous delivery (CI/CD) system. In such embodiments, the CI/CD system could be used to assess coverage associated with the adoption of cloud native monitoring systems across the company or organization and could, based on the assessed coverage, abort a build if it does not meet particular metrics (e.g., regression test metrics and criteria necessary to deploy an application, etc.). Embodiments are not so limited, however, and the CI/CD system could be used to assess coverage associated with the adoption of cloud native monitoring systems across the company or organization and could, based on the assessed coverage, determine to proceed with migration if the build meets particular metrics.

Illustratively, the techniques described herein may be performed by hardware, software, and/or firmware, such as in accordance with migration assessment process 248, which may include computer executable instructions executed by the processor 220 (or independent processor of interfaces 210) to perform functions relating to the techniques described herein.

Specifically, according to various embodiments, a device obtains testing parameters used by a plurality of agents in a network to perform testing with respect to an online application. The device identifies overlapping parameters among the testing parameters and generates a consolidated set of testing parameters for the overlapping parameters. The device configures the plurality of agents such that a singular testing agent performs testing with respect to the online application using the consolidated set of testing parameters instead of multiple testing agents performing testing with respect to the online application using the overlapping parameters.

Figure 4:
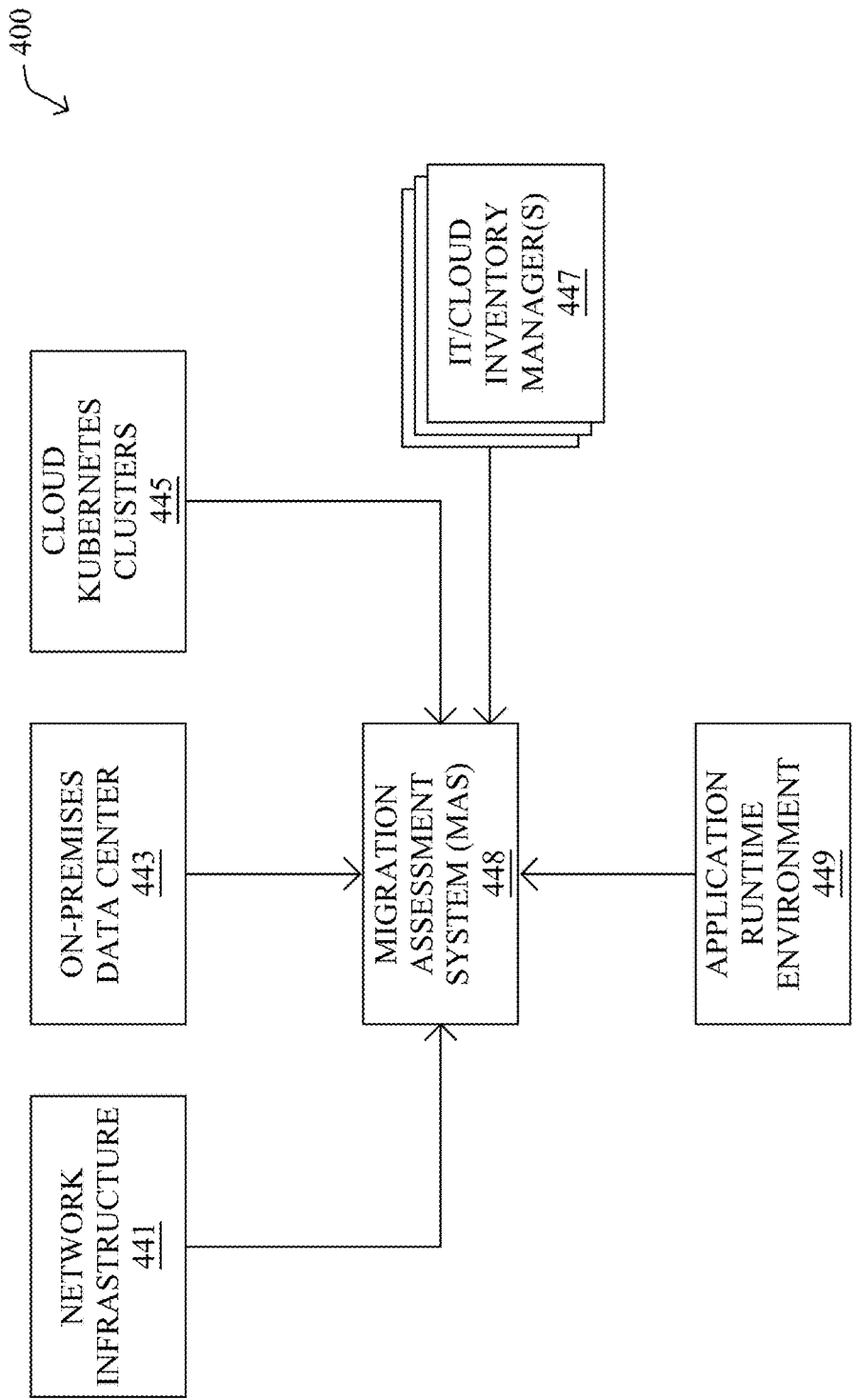
FIG. 4 illustrates an example network for cloud native observability migration and assessment.

Operationally, FIG. 4 illustrates an example network 400 for cloud native observability migration and assessment. As shown in FIG. 4, the network 400 includes network infrastructure 441, an on-premises data center 443, cloud Kubernetes clusters 445, information technology/cloud inventory manager(s) 447, an application runtime environment 449, and a migration assessment system 448. In some embodiments, the migration assessment system 448 can include hardware (e.g., a controller, processor, logic, etc.) configured to execute instructions to perform the operations described herein.

In some embodiments, the migration assessment system 448 performs passive and inline monitoring of the network 400. For example, the migration assessment system 448 can monitor telemetry data (e.g., OpenTelemetry data), metrics, events, etc. associated with the network infrastructure 441, the on-premises data center 443, the cloud Kubernetes clusters 445, and/or the information technology/cloud inventory manager(s) 447. The migration assessment system 448 can then receive the monitored telemetry data (e.g., OpenTelemetry data), metrics, events, etc. and/or can process the monitored telemetry data (e.g., OpenTelemetry data), metrics, events, etc. The migration assessment system 448 may be referred to herein in the alternative as a "device," a "controller," or a "processor," given the context of the disclosure.

In addition, the migration assessment system 448 performs agent monitoring involving the application runtime environment 449. The migration assessment system 448 can then receive information corresponding to the agent monitoring involving the application runtime environment 449.

In some embodiments, the migration assessment system 448 compares the monitoring reports (e.g., the monitored telemetry data (e.g., OpenTelemetry data), metrics, events, etc. associated with the network infrastructure 441, the on-premises data center 443, the cloud Kubernetes clusters 445, and/or the information technology/cloud inventory manager(s) 447 and the agent monitoring involving the application runtime environment 449) to information associated with the information technology/cloud inventory manager(s) 447. This allows for an overall assessment of the migration process, which can then be visualized for a user, as described in more detail herein.

In some embodiments, the migration assessment system 448 may monitor an OpenTelemetry Protocol (OTLP) to detect the presence of OpenTelemetry data associated with the network 400. In general, the OTLP refers to a general-purpose telemetry data delivery protocol and defines the encoding, transport, and delivery mechanism of telemetry data between telemetry sources, intermediate nodes, such as collectors, and telemetry backends, among others. Embodiments are not limited to the use of OTLP to detect the presence of OpenTelemetry data associated with the network 400, however, and it will be appreciated that other techniques to detect the presence of OpenTelemetry data associated with the network 400 are contemplated within the scope of the disclosure.

Figure 5:
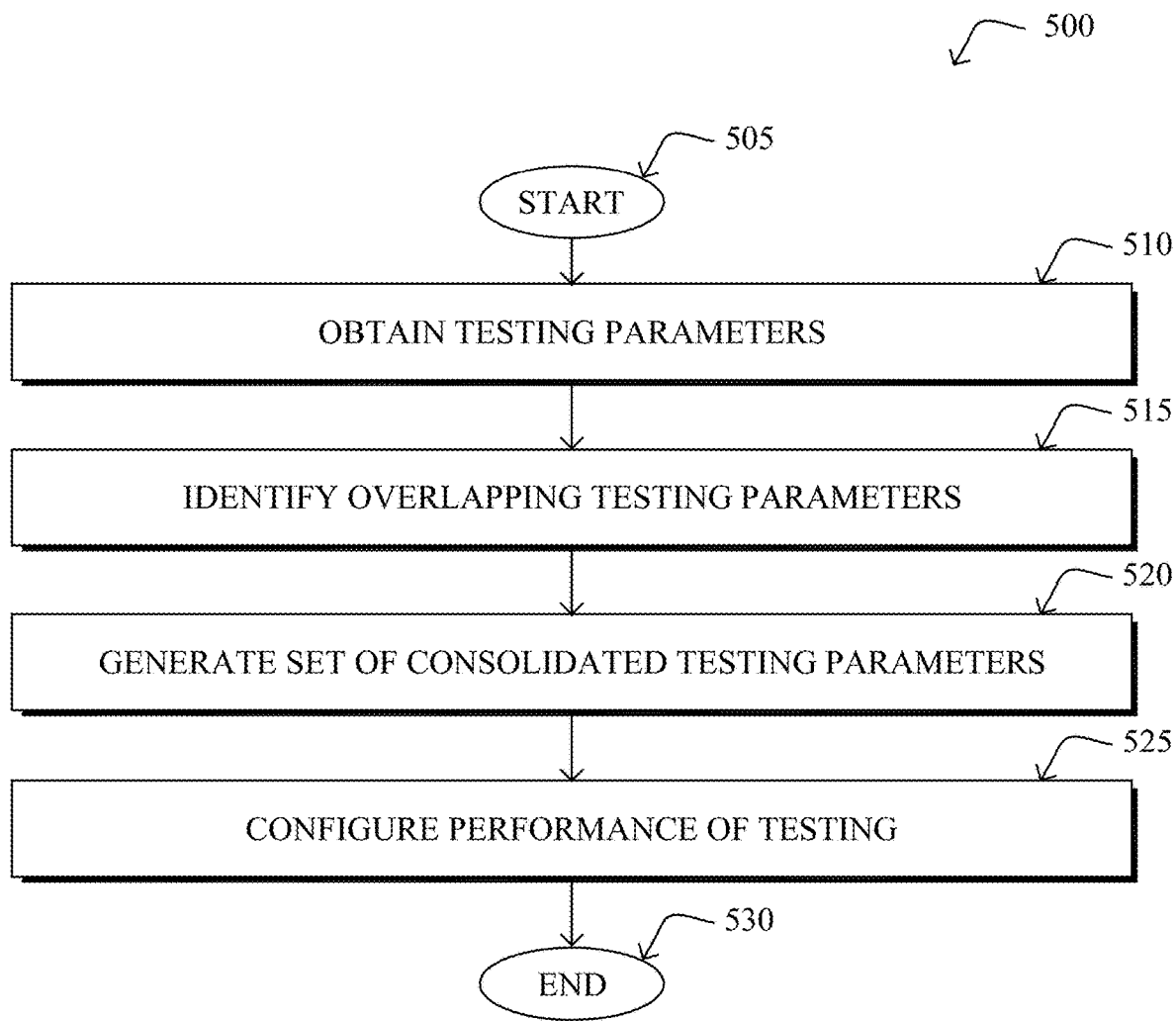
FIG. 5 illustrates an example simplified procedure for cloud native observability migration and assessment.

FIG. 5 illustrates an example simplified procedure 500 (e.g., a method) for cloud-native observability migration and assessment. For example, a non-generic, specifically configured device for cloud-native observability migration and assessment (e.g., device 200), may perform procedure 500 by executing stored instructions (e.g., migration assessment process 248). The procedure 500 may start at step 505, and continues to step 510, where, as described in greater detail above, the device (e.g., a controller, processor, migration assessment system 448, etc.) may obtain, for each of a plurality of agents in a network, testing parameters used by that agent to perform testing with respect to an online application. The plurality of agents may be associated with different organizations, as described above.

In various embodiments, the testing parameters indicate a particular protocol to be used to perform the testing. Embodiments are not so limited, however, and in some embodiments, the testing parameters indicate a frequency to perform the testing or a time interval between the testing.

At step 515, as detailed above, the device identifies overlapping parameters among the testing parameters.

At step 520, the device generates a consolidated set of testing parameters for the overlapping parameters. In various embodiments, the device generates the consolidated set of testing parameters based on an opt-in performed by at least one agent among the plurality of agents.

At step 525, as detailed above, the device configures the plurality of agents such that a singular testing agent performs testing with respect to the online application using the consolidated set of testing parameters instead of multiple testing agents performing testing with respect to the online application using the overlapping parameters. As described above, the testing can include performance of a Wi-Fi test, a Hypertext Transfer Protocol load time test, or a domain name service test. In some embodiments, the singular testing agent comprises a virtual cloud agent. Embodiments are not so limited, however, and in some embodiments, the singular testing agent comprises a user agent deployed on a user device.

In various embodiments, a first agent in the network requests performance of the testing at a first time interval and a second agent in the network requests performance of the testing at a second time interval. In such embodiments, the procedure 500 includes comprises reporting a result of the testing to the first agent upon expiry of the first time interval and reporting the result of the testing to the second agent upon expiry of the second time interval.

As discussed above, the device computes an energy savings associated with using the consolidated set of testing parameters and providing an indication of the energy savings for display.

Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for cloud-native observability migration and assessment. More specifically, by allowing for the automatic discovery of migration to cloud native platforms (e.g., OpenTelemetry, etc.) in a network, users are provided with the ability to detect and report metrics on the adoption, migration, and deployment of cloud native monitoring systems (e.g., OpenTelemetry full stack observability systems (FSO)) across applications, virtualized clusters, networking gear, and cloud native environments to assess a company's velocity and service levels during migration from proprietary monitoring systems (e.g., application performance monitoring systems, etc.) to a cloud native monitoring system, such as an OpenTelemetry system.

While there have been shown and described illustrative embodiments that provide for cloud-native observability migration and assessment, it is to be understood that various other adaptations and modifications may be made within the intent and scope of the embodiments herein. In addition, while certain processes and protocols are shown, other suitable processes and protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
monitoring traffic in a network at a first time to collect telemetry data related to deployment of cloud-native monitoring instrumentation;
using the telemetry data to detect presence of one or more monitoring agents within the network by detecting OpenTelemetry Protocol (OTLP) data;
monitoring traffic in the network at a subsequent time to collect additional telemetry data related to the deployment of cloud-native monitoring instrumentation;
using the additional telemetry data to detect the presence of one or more monitoring agents within the network by detecting OpenTelemetry Protocol (OTLP) data;
comparing the telemetry data, the additional telemetry data, and stored monitoring inventory data to automatically discover differences in cloud-native observability instrumentation coverage within the network; and
generating an updated inventory reflecting the automatically discovered differences in cloud-native observability instrumentation coverage within the network.

2. The method of claim 1, wherein the cloud-native observability instrumentation comprises OpenTelemetry observability agents deployed across one or more applications, clusters, network devices, or cloud native environments.

3. The method of claim 1, wherein monitoring traffic in the network comprises performing passive and inline monitoring of the network without requiring changes to applications deployed within the network.

4. The method of claim 1, wherein the method further comprises processing the telemetry data to extract metrics regarding adoption of cloud-native monitoring systems across the network.

5. The method of claim 1, further comprising identifying overlapping monitoring parameters among the detected monitoring agents and generating a consolidated set of monitoring parameters.

6. The method of claim 1, wherein the method is performed as part of a continuous integration/continuous delivery (CI/CD) system.

7. The method of claim 1, wherein the differences in cloud-native observability instrumentation coverage within the network are due to newly deployed or modified cloud-native observability instrumentation.

8. A system comprising:
one or more computers each including a processor and a memory, wherein the one or more computers are operable to execute instructions which cause the system to perform operations including:
monitoring traffic in a network at a first time to collect telemetry data related to deployment of cloud-native monitoring instrumentation;
using the telemetry data to detect presence of one or more monitoring agents within the network by detecting OpenTelemetry Protocol (OTLP) data;
monitoring traffic in the network at a subsequent time to collect additional telemetry data related to the deployment of cloud-native monitoring instrumentation;
using the additional telemetry data to detect the presence of one or more monitoring agents within the network by detecting OpenTelemetry Protocol (OTLP) data;
comparing the telemetry data, the additional telemetry data, and stored monitoring inventory data to automatically discover differences in cloud-native observability instrumentation coverage within the network; and
generating an updated inventory reflecting the automatically discovered differences in cloud-native observability instrumentation coverage within the network.

9. The system of claim 8, wherein the cloud-native observability instrumentation comprises OpenTelemetry observability agents deployed across one or more applications, clusters, network devices, or cloud native environments.

10. The system of claim 8, wherein monitoring traffic in the network comprises performing passive and inline monitoring of the network without requiring changes to applications deployed within the network.

11. The system of claim 8, wherein the operations further comprise processing the telemetry data to extract metrics regarding adoption of cloud-native monitoring systems across the network.

12. The system of claim 8, wherein the operations further comprise identifying overlapping monitoring parameters among the detected monitoring agents and generating a consolidated set of monitoring parameters.

13. The system of claim 8, wherein the monitoring is performed as part of a continuous integration/continuous delivery (CI/CD) system.

14. The system of claim 8, wherein the differences in cloud-native observability instrumentation coverage within the network are due to newly deployed or modified cloud-native observability instrumentation.

15. A volatile computer-readable media including instructions, which when executed on one or more computers each including a processor and a memory, cause the computers to perform operations including:
using telemetry data to detect presence of one or more monitoring agents within a network by detecting OpenTelemetry Protocol (OTLP) data;
monitoring traffic in the network at a subsequent time to collect additional telemetry data related to deployment of cloud-native monitoring instrumentation;
using the additional telemetry data to detect the presence of one or more monitoring agents within the network by detecting OpenTelemetry Protocol (OTLP) data;
comparing the telemetry data, the additional telemetry data, and stored monitoring inventory data to automatically discover differences in cloud-native observability instrumentation coverage within the network; and
generating an updated inventory reflecting the automatically discovered differences in cloud-native observability instrumentation coverage within the network.

16. The computer-readable media of claim 15, wherein the cloud-native observability instrumentation comprises OpenTelemetry observability agents deployed across one or more applications, clusters, network devices, or cloud native environments.

17. The computer-readable media of claim 15, wherein monitoring traffic in the network comprises performing passive and inline monitoring of the network without requiring changes to applications deployed within the network.

18. The computer-readable media of claim 15, wherein the operations further comprise processing the telemetry data to extract metrics regarding adoption of cloud-native monitoring systems across the network.

19. The computer-readable media of claim 15, wherein the operations further comprise identifying overlapping monitoring parameters among the detected monitoring agents and generating a consolidated set of monitoring parameters.

20. The computer-readable media of claim 15, wherein the operations further comprise identifying overlapping monitoring parameters among the detected monitoring agents and generating a consolidated set of monitoring parameters.

\* \* \* \* \*